United States Patent [19]

Takahashi

[11] 4,445,157

[45] Apr. 24, 1984

[54] FLEXIBLE MAGNETIC DISK CASSETTE

[75] Inventor: Kiyoshi Takahashi, Machida, Japan

[73] Assignee: Sony Corporation, Tokyo, Japan

[21] Appl. No.: 292,447

[22] Filed: Aug. 13, 1981

[30] Foreign Application Priority Data

Aug. 14, 1980 [JP]  Japan .......................... 55-115305[U]

[51] Int. Cl.³ .................. G11B 23/02; G11B 5/82; G11B 5/012; G11B 5/016
[52] U.S. Cl. .................................... 360/133; 360/97; 360/99; 360/135
[58] Field of Search ............... 360/133, 99, 132, 135, 360/177, 137, 86, 97; 206/444; 346/137

[56] References Cited

U.S. PATENT DOCUMENTS

| | | | |
|---|---|---|---|
| 3,416,150 | 12/1968 | Lindberg, Jr. ................ | 340/174.1 |
| 4,060,839 | 11/1977 | Meadows ....................... | 360/99 |
| 4,120,012 | 10/1978 | Bowers .......................... | 360/133 |
| 4,149,207 | 4/1979 | Porter, Jr. et al. ............. | 360/133 |
| 4,152,740 | 5/1979 | Stratton ......................... | 360/133 |
| 4,166,622 | 9/1979 | Rager ............................ | 360/135 |
| 4,224,648 | 9/1980 | Roling ........................... | 360/97 |
| 4,232,870 | 11/1980 | Iemenschot .................... | 360/97 |
| 4,274,119 | 6/1981 | Hayward ........................ | 360/99 |
| 4,296,448 | 10/1981 | Garcia ........................... | 360/135 |
| 4,340,286 | 7/1982 | Carr .............................. | 360/135 |
| 4,352,135 | 9/1982 | De Moss ........................ | 360/99 |

*Primary Examiner*—Robert Martin Kilgore
*Attorney, Agent, or Firm*—Hill, Van Santen, Steadman & Simpson

[57] ABSTRACT

A flexible magnetic disk cassette includes a flexible magnetic disk. A center core disk is also provided having a center hollow and raised fringe, and is attached at a center of the flexible magnetic disk with the raised fringe. A cover having an upper half and lower half for containing the flexible magnetic disk with the center core disk is provided. The lower half of the cover has a driving hole a little larger than an outer diameter of the center hollow of the center core disk.

24 Claims, 28 Drawing Figures

FLEXIBLE MAGNETIC DISK CASSETTE

BACKGROUND OF THE INVENTION

Field of the Invention

This invention relates to a flexible magnetic disk cassette capable of being used for the recording and reproducing of various analog and digital signals, and a recording and/or reproducing apparatus for the flexible magnetic disk cassette. More particularly, this invention is concerned with a disk cassette having a cassette cover in which is rotatably accommodated a recording and reproducing disk having flexibility such as a sheet-like magnetic disk (magnetic sheet), and a recording and/or reproducing apparatus for the same.

Description of the Prior Art

Referring to FIG. 1, there is shown a conventional recording and reproducing disk cassette designated by the reference numeral 1, which comprises a flat cassette cover 4 in the form of a rectangular parallelepiped composed of upper and lower halves 2 and 3, and a sheet-like flexible magnetic disk (magnetic sheet) 5 accommodated rotatably within the cassette cover 4. The magnetic disk 5 has a magnetic layer formed on both surfaces thereof, and on the central part thereof there is a center core disk 6 consisting of a circular plate stuck thereon with adhesive or the like. In the central part of the center core disk 6 there is formed a rotary shaft insertion opening 7.

When the disk cassette 1 is installed (loaded) onto a magnetic recording and/or reproducing apparatus (not shown), a rotating carriage 8 engages in a center opening 3a of the lower half 3 and at the same time a rotary shaft 9 is inserted in the rotary shaft insertion opening 7. In this state the center core disk 6 is attracted and fixed onto the rotating carriage 9 by means of an attracting member (not shown) consisting of a magnet. In this case, the magnetic disk 5 is disposed centrally in its thickness direction in consideration of the construction and dimension of the cassette cover 4. On the other hand, the magnetic head 11 is inserted into a head insertion opening 10 formed in the lower half 3 and then is brought into contact with the magnetic surface of the magnetic disk 5.

In such a loaded state, the center core disk 6 is rotated together with the rotating carriage 9 by means of a driving unit such as a motor 12, whereupon the magnetic disk 5 is rotated within the disk cassette 1. In association therewith the magnetic head 11 is moved in a radial direction of the magnetic sheet 5 (namely in the direction of arrow a in FIG. 27), thereby performing a desired recording or reproducing operation.

In the disk cassette 1 of this sort, in order to prevent the peripheral edge portion of the magnetic disk 5 from striking against and being bent by the upper and lower halves 2 and 3, a ring-like projection 13 is formed on the inner surface of the upper half 2 to restrict the displacement of the center core disk 6 relative to the cassette cover 4. The disk cassette is installed, for example, in the following dimensional relation relative to the cassette cover 4, the projection 13, the center core disk 6 and the magnetic disk 5. The thickness $l_1$ of the cassette cover 4 is 3.4 mm; the plate thickness $l_2$ of the upper half 2 is 0.8 mm; the plate thickness $l_3$ of the center opening portion 3a of the lower half 3 is 1.3 mm; the projecting length $l_4$ of the projection 13 is 0.5 mm; the spacing $l_5$ between the magnetic disk 5 and the projection 13 and the spacing $l_5$ between the magnetic disk 5 and a ring-like projection 14 of the lower half 3 are each 0.4 mm; the thickness $l_6$ of the center core disk 6 is 0.5 mm; and the spacing $l_7$ between the inner surface of the upper half 2 and the center core disk 6 is 0.4 mm (see FIG. 2). Thus, the magnetic disk 5 is disposed centrally in the thickness direction of the cassette cover 4.

However, when the disk cassette 1 is not installed on a magnetic recording and/or reproducing apparatus, that is when the disk cassette 1 is not in use, if the magnetic disk 5 and the center core disk 6 move toward the lower half 3 by virtue of their own weights as indicated with a dot-dash line in FIG. 2, there is formed a gap of about 0.3 mm between the tip end of the projection 13 of the upper half 2 and the upper surface of the center core disk 6. In the presence of this gap, the movement of the center core disk 6 is no longer restricted by the projection 13, that is the center core disk 6 and the magnetic disk 5 move freely in the horizontal direction within the cassette cover 4, so that the peripheral edge portion of the magnetic disk 5 may strike against the side of the cassette cover 4 and be bent thereby. Once the peripheral edge portion of the magnetic disk 5 is bent, it is no longer possible to perform a good recording and reproducing operation in the vicinity of the bent peripheral edge portion.

Such an inconvenience is overcome by making larger thickness $l_5$ of the center core disk 6 and thereby making larger the overlapping length $l_8$ between the projection 13 and the center core disk 6 at the time of installing of the disk cassette 1. But this has not been realized because of the resulting very narrowed space (particularly in the thickness direction) within the cassette cover 4 and because of, as previously noted, the requirement that the magnetic disk 5 must be disposed centrally in the thickness direction of the cassette cover 4.

SUMMARY OF THE INVENTION

An object of the present invention is to provide a flexible magnetic disk cassette which overcomes the foregoing problems associated with the prior art.

More specifically, it is an object of the present invention to provide a flexible magnetic disk cassette in which, even while the disk cassette is not in use, the movement of the center core disk and hence of the magnetic disk are surely restricted within a predetermined range.

It is another object of the present invention to provide a flexible magnetic disk cassette which has a relatively flat shape.

In accordance with an aspect of the present invention, a flexible magnetic disk cassette includes a flexible magnetic disk, a center core disk having a center hollow and raised fringe, and being attached at a center of said flexible magnetic disk with said raised fringe. A cover is provided having an upper half and a lower half for containing the said flexible magnetic disk with said center core disk, said lower half having a driving hole a little larger than an outer diameter of said center hollow of said center core disk.

Other objects, features and advantages according to the present invention will become apparent from the following detailed description of an illustrative embodiment shown in the accompanying drawings.

DESCRIPTION OF THE PREFERRED EMBODIMENTS

An embodiment of this invention will be described with reference to FIGS. 3 to 28.

In this embodiment, a flexible magnetic disk cassette containing a sheet-like flexible magnetic disk is installed onto a recording and/or reproducing apparatus and the recording and/or reproducing operation is performed.

Figure 1:
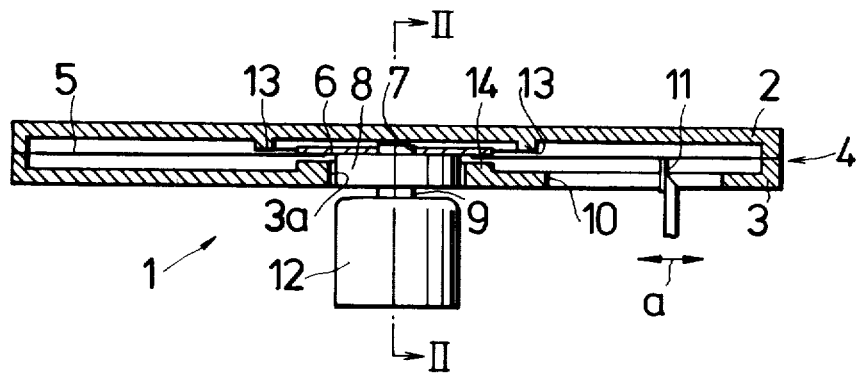
FIG. 1 is a longitudinal sectional view schematically illustrating a conventional disk cassette which is installed on the magnetic recording and/or reproducing apparatus.
Figure 2:
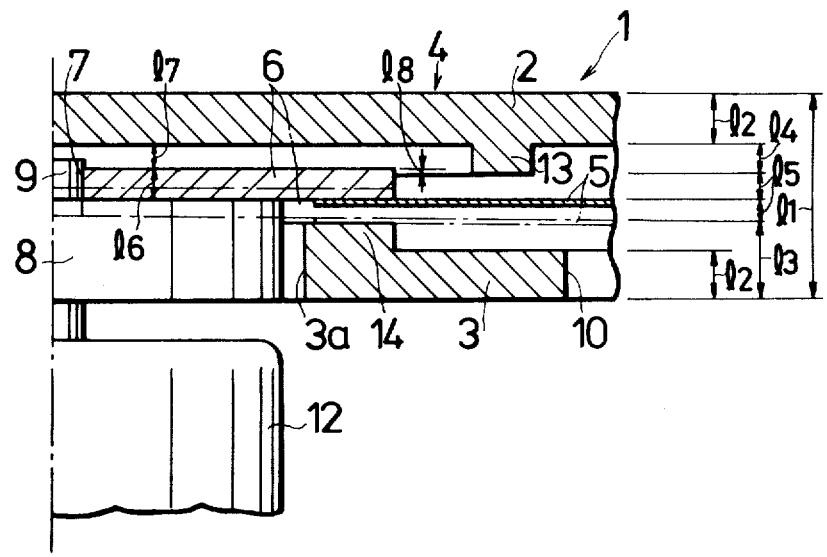
FIG. 2 is an enlarged sectional view taken on line II—II of FIG. 1.
Figure 3:
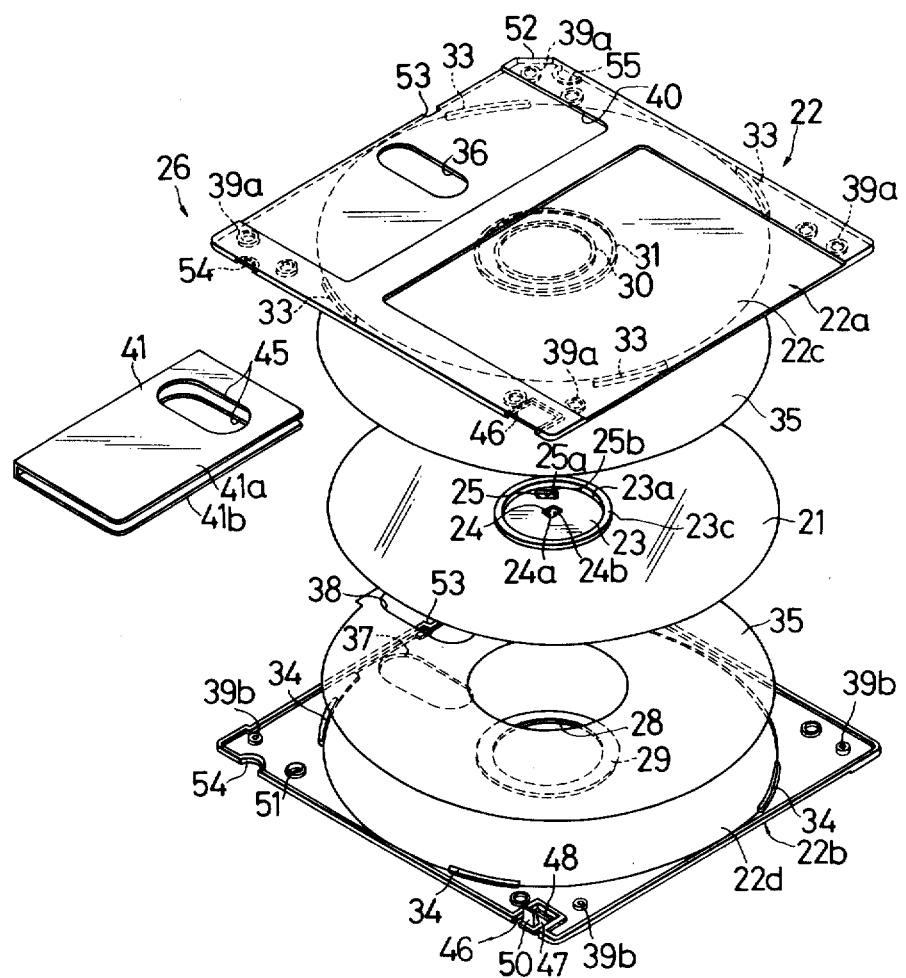
FIG. 3 is an exploded perspective view of a flexible disk cassette according to the embodiment of this invention.
Figure 7:
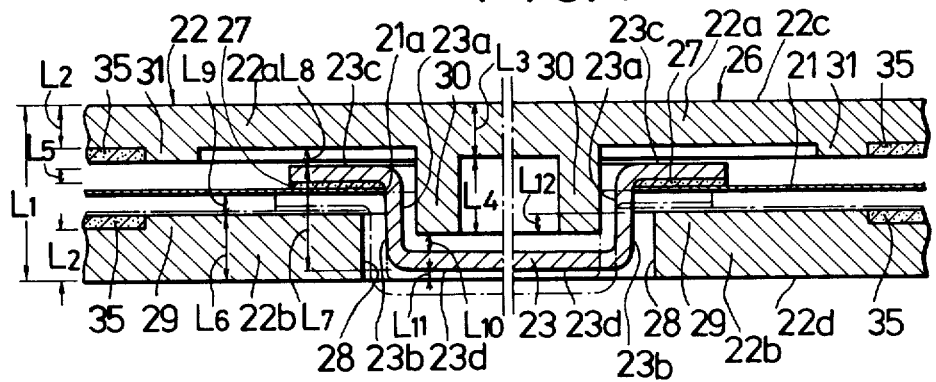
FIG. 7 is a longitudinal sectional view of a main part of the disk cassette showing its central portion, partly omitted.

First, an explanation is here given concerning a disk cassette 26 comprising a flexible magnetic disk 21 and a cassette cover 22. As shown in FIG. 3, the flexible magnetic disk 21 is formed of, for example, a thin disk-like high polymer film having a thickness of 0.4 mm, and a magnetic layer uniformly formed on both surfaces to which a recording/reproducing magnetic head is to be brought into contact. At the center of the flexible magnetic disk 21 there is formed a circular center opening 21a (See FIG. 7) at which there is attached a center core disk 23 made of a ferromagnetic material such as iron. The center core disk 23 is formed from a flat disk by pressure and, as shown in FIG. 3 and FIG. 7, on one side thereof there is formed a center hollow 23a, and on the other side thereof there is formed a disk-like convex portion 23b. At the peripheral edge portion of the center core disk 23, there is formed a ring-like raised fringe 23c. Thus, the center core disk 3 is constructed in the form of a pan. As shown in FIG. 7, a ring-like raised double-sided adhesive sheet 27 is bonded to the raised fringe 23c of the center core disk 23, and the peripheral edge portion of the center opening 21a of the magnetic disk 21 is bonded to the double-sided adhesive sheet 27, whereby the center core disk 23 and the flexible magnetic disk 21 are joined together integrally.

At a nearly central part of the center cord disk 3, a square center aperture 24 having a V-shaped corner is formed as a motor shaft insertion aperture, and at a position which is distant by a predetermined distance from the center aperture 24, a rectangular driving and positioning aperture 25 is formed as a positioning pin insertion aperture. As clearly shown in FIG. 5, the center $0_1$ of the center aperture 24 is off the center $0_2$ of the center core disk 23 and the flexible magnetic disk 21, and is slightly distant by a predetermined distance toward the driving and positioning aperture 25. The center aperture 24 and the driving and positioning aperture 25 are formed so that a pair of diagonal lines $d_1$ and $d_2$ of the center aperture 24 are each parallel with short and long side portions 25b and 25a of the driving and positioning aperture 25, respectively. Furthermore, the length of one side of the center aperture 24 is slightly larger than the diameter of the motor shaft so that the motor shaft when fitted in the center aperture 24 provides a slight looseness. The reason why the center of the center aperture 24 is apart from the center of the center core disk 23, as will be described in detail later, is that it is intended to coincide the center of the motor shaft fitted in the center aperture 24 of the center core disk 23 with the center of the flexible magnetic disk 21 when the disk cassette 26 is installed onto the recording and/or reproducing apparatus.

Figure 4:
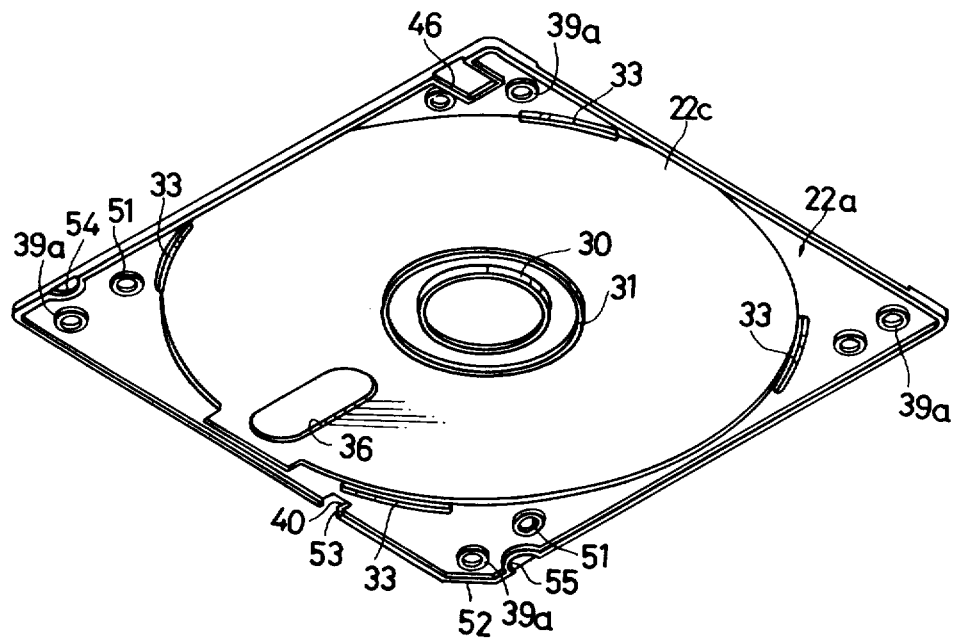
FIG. 4 is a perspective view of an upper half of a cassette cover viewed from below.
Figure 6:
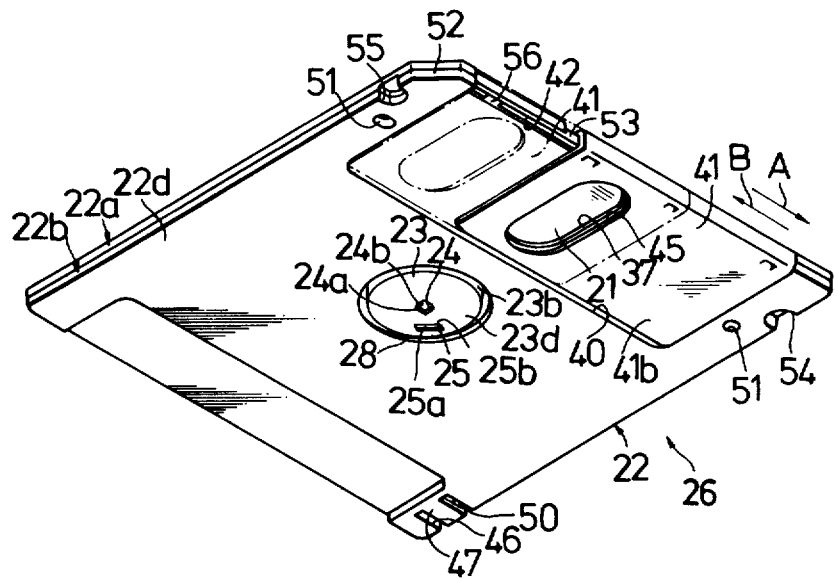
FIG. 6 is a perspective view of the disk cassette from below.

On the other hand, the cassette cover 22 for accommodating the flexible magnetic disk 21, as shown in FIG. 3, is composed of an upper half 22a and a lower half 22b which are made of, for example, an injection molded article from ABS resin containing an antistatic agent. The outer peripheral portions of the upper and lower halves 22a and 22b are welded to each other to form a flat rectangular parallelepiped as a whole. At a nearly central part of lower half 22b there is formed a circular center opening as a driving hole 28, and at the peripheral edge portion of the driving hole 28 and on the inner surface of the lower half 22b there is integrally formed a ring-like projection 29. As shown in FIG. 6, the convexed portion 23b of the center core disk 23 is fitted in the driving hole 28 in a state which is slightly loose. On the inner surface of the central part of the upper half 22a, as shown in FIG. 4 there is integrally formed a ring-like projection 30, and also around the projection 30 there is integrally formed a ring-like projection 31 which is concentric with the projection 30. The projecting length of the projection 30 is longer than that of the projection 31 and hence, as shown in FIG. 7, the projection 30 extends beyond the projection 31 and projects on the inner surface side of the lower half 22b. The ring-like projection 30 is inserted in the center hollow 23a of the center core disk 23 in a state which is slightly loose.

Now, the cassette case 22, the upper and lower halves 22a and 22b, the center core disk 23, and the ring-like projection 30 of the upper half 22a are, for example, in the following dimensional relation. The thickness $L_1$ of the cassette case 22 is 3.4 mm, the thickness $L_2$ of an upper plate 22c and that of a lower plate 22d of the upper and lower halves 22a and 22b are each 0.8 mm respectively, the thickness $L_3$ of the upper plate 22c of the upper half 22a of the portion surrounded with the projection 10 is 1.0 mm, the projection length $L_4$ of the projection 30 is 1.5 mm, the thickness $L_5$ of the center core disk 3 is 0.3 mm, the thickness $L_6$ of the lower plate 22d of the lower half 22b adjacent to the center opening 28 is 1.3 mm, and the height $L_7$ of the center core disk 23 is 1.8 mm (See FIG. 7).

When the disk cassette 26 is installed onto the recording and/or reproducing apparatus as will be described later, the flexible magnetic disk 1 is disposed nearly centrally in the direction of the thickness of the cassette cover 22 as shown by the solid line in FIG. 7 and then is rotated. In this case, the distance $L_8$ between the fringe 23c of the center core disk 23 and the inner surface of the upper half 22a and the distance $L_9$ between the flexible magnetic disk 21 and the projection 29 of the lower half 22b are each 0.4 mm. The distance $L_{10}$ between the tip end of the projection 30 of the upper half 22a and a lower surface 23d of the center disk is 0.4 mm, and the distance $L_{11}$ between the outer surface of the lower half 22b and the lower surface 23d of the center core disk 23 is 0.2 mm (See FIG. 7). When the disk cassette is not in use, the center core disk 33 and the flexible magnetic disk 21 are placed on the lower half 22b by virtue of their own weights, for example, as shown by dot-dash line in FIG. 7. In this case, the tip end portion of the projection 30 of the upper half 22a and the projection 29 of the lower half 22b overlap with each other by 0.4 mm (distance $L_{12}$) so even if the center core disk 23 is moved, a part of the center hollow 23a of the center core disk 23 is sure to engage the projection 30. Thereby the looseness in a planar direction of the center core disk 23 and hence the flexible magnetic disk 21 is kept within a predetermined range, and therefore the projection 30 and the center hollow 23a of the center core disk 23 are not disengaged from each other along with the displacement of the center core disk 23. In case the disk cassette 26 is turned upside down from the state shown in FIG. 7 and consequently the center core disk 23 is placed on the upper half 22a by virtue of its own weight, the projection 30 comes into a completely fitted state within the center hollow 23a of the center core disk 23, so that, as in the aforesaid case, the amount of displacement of the center core disk 23 and hence of the magnetic disk 21 is kept within a predetermined range.

Figure 5:
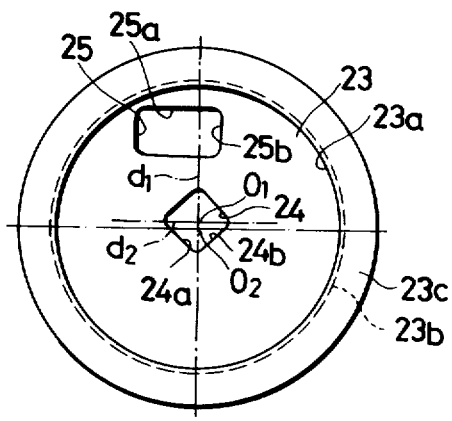
FIG. 5 is a plan view of a center core disk viewed from a recessed side thereof.

In the disk cassette 26 having the above construction, the amount of displacement of the center core disk 21 and of the flexible magnetic disk 21 can be regulated exactly by the projection 30 until a gap between the upper and lower plates 22c and 22d becomes wider by 2.2 mm (the sum of the overlapping length of 0.4 mm and the center core disk height os 1.8 mm) while the upper and lower halves 22a and 22b are moved from the state shown in FIG. 5 toward the exterior, namely in the direction in which the upper plate 22c and the lower plate 22d go away from each other.

On the inside surfaces of the upper and lower halves 22a and 22b there are integrally formed four arcuate ribs 13 and 14 respectively extending concentrically with the driving hole 28 at regular intervals. When the cassette cover 22 is assembled, the ribs 33 of the upper half 22a and the ribs 34 of the lower half 22b are disposed on the same circumference, and at the same time the ribs 33 and 34 are positioned adjacent to each other at the four corners of the cassette cover 22 whereby there is formed substantially one pair of ribs at each corner. The flexible magnetic disk 21 is disposed so as to be surrounded with these ribs 33 and 34. The ribs 33 abut the inner surface of the lower plate 22d of the lower half 22b, and the ribs 34 abut the inner surface of the upper plate 22c of the upper half 22a. Accordingly, the cassette cover 2, which is flat and easy to deform even by a small external force, is mechanically reinforced. Furthermore, in order to avoid possible damage or wear of the flexible magnetic disk 21, a magnetic disk protecting non-woven fabric 35 is attached by heat-weld or a like means between the projection 31 and the ribs 33 and also between the projection 29 and the ribs 34 in the upper and lower halves 22a and 22b.

The distance from the center of the driving hole 28 of the lower half 22b to the ribs 33 and 34 is somewhat longer than the radius of the flexible magnetic disk 21 is displaced within the cassette cover 22 by the looseness of the center core disk 23 in the driving hole 28, the peripheral edge portion of the flexible magnetic disk 21 does not abut the ribs 33 and 34.

In the upper and lower halves 22a and 22b of the cassette cover 22 and the non-woven fabric 35, there are respectively formed openings 36, 37 and 38 of the same shape extending in a radial direction of the flexible magnetic disk 21, the openings 36, 37 and 38 being overlapped in opposed relation. And as will be described later, a magnetic head is inserted in the opening formed in the lower half 22b through the opening formed in the lower non-woven fabric 35, while a head pressing pad is inserted from the opening 16 formed in the upper half 22a through the opening 18 formed in the upper non-woven fabric 35. In FIG. 3, the reference numerals 39a, 39b, are positioning projections for mutual engagement when assembling the upper and lower halves 22a and 22b.

Figure 8:
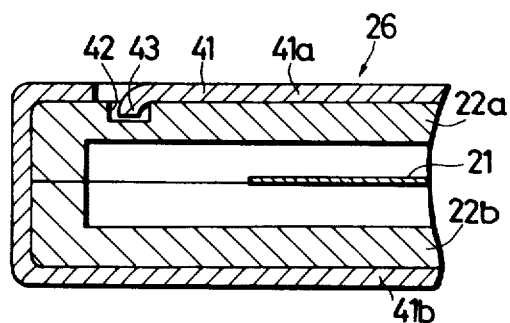
FIG. 8 is a longitudinal sectional view of a main part of the disk cassette showing a guide means comprising a guide groove formed in the cassette cover and a pawl-like projection formed on a shutter.
Figure 9:
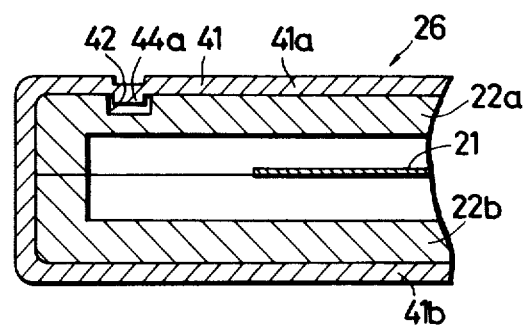
FIG. 9 and FIG. 10 are each longitudinal sectional views of a main part of the disk cassette showing a modification of the guide means.
Figure 10:
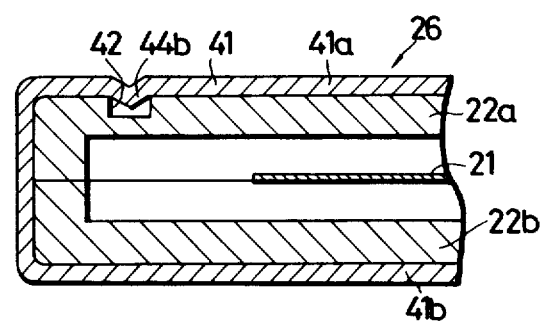

As shown in FIG. 3, there is formed a recess 40 on each of the outer surfaces of the upper and lower halves 22a and 22b in the respective portions where there are formed the pad insertion opening 36 and the head insertion opening 37. In the recess 40 there is mounted a shutter 44 having a U-shaped cross-section made from aluminum, stainless steel, a synthetic resin, or the like, so as to be slidable in a predetermined direction. In the recess 40 of the lower half 22b, as shown in FIG. 6, a rectilinear guide groove 42 is formed extending along a side edge portion of the cassette cover 22, while in relation to the guide groove 42 there is formed in the shutter 41, as shown in FIG. 8, a pawl-like projection 43, for example, in three places, formed by inwardly bending a part of the shutter 41 by means of pressure or the like. The pawl-like projection 43 of the shutter 41 is inserted in the guide groove 42 of the lower half 22b so that the shutter 41 is guided by the groove 22 slidably in the direction of arrows A and B in FIG. 6. The shutter sliding mechanism is not limited to what has just been mentioned. For example, as shown in FIG. 9, a part of the shutter 41 may be subjected to half-blanking by means of pressing or the like to form a projection 44a which projects inwardly of the shutter 41, and the projection 44a is slidably fitted in the guide groove 42. Further, as shown in FIG. 10, a V-shaped projection 44b may be formed which projects inwardly of the shutter 41. This projection 44b is slidably fitted in the guide groove 42. In the side edge portion of the lower half 22b where the guide groove 42 is formed, as shown in FIG. 6 there is formed a shutter mounting and demounting recess 56 in communication with the guide groove 42, for example in three places. When the shutter 41 is slid, for example, in the direction of arrow B in FIG. 6 to the position indicated with a dot-dash line, the recess 56 and the pawl-like projection 43 of the shutter 41 become opposed to each other. In this state, if a force is applied in a pulling direction of the shutter 41 from the cassette cover 22, the shutter 41 can be easily demounted or removed from the cassette cover 22.

In each of the opposed plate portions 41a and 41b of the shutter 41 there is formed an opening 45 having substantially the same shape as the pad and head insertion openings 36 and 37. By sliding the shutter 41 along the guide groove 42, the pad and head insertion openings 36 and 37 can be opened or closed selectively. In case the shutter 41 is disposed in such a position as indicated with a solid line in FIG. 6, the opening 45 in the shutter 41 and the openings 36 and 37 in the cassette cover 22 become overlapped with one another, that is the openings 36 and 37 are opened. On the other hand, in case the shutter 41 is slid to the position shown with a dot-dash line in FIG. 4, the openings 36 and 37 are covered and closed with the shutter 41.

In the side portion of the cassette cover 22 where the shutter 41 is mounted, there is formed a channel-shaped cutout portion 53 as shown in FIG. 3 and FIG. 6. This cutout portion 53 is opened or closed along with the above-described sliding movement of the shutter 41. That is, when the opening 45 in the shutter 41, the openings 36 and 37 in the cassette cover 22, and the opening 38 of the fabric 35 overlap each other, the cut-out portion 53 is opened, while when the openings 36, 37 and 38 are covered with the shutter 41, the cutout portion 53 is also closed. In case the cutout portion 53 is opened, as will be described later, the cassette cover 22 can be installed up to the right position of the recording and/or reproducing apparatus, and recording and reproducing operations can be performed. But, in case the cutout portion 53 is closed by the shutter 41, as will be described later, the disk cassette 26 cannot be installed in the normal operating position on the apparatus and therefore undesired operation is prevented. In order to prevent the cassette cover 22 from being installed in an erroneous direction, there is formed a triangular cutout portion 53 at one predetermined corner of the cassette cover 22.

Figure 11:
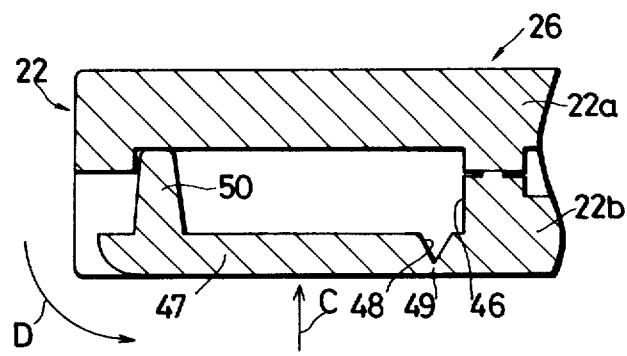
FIG. 11 is a longitudinal sectional view of a main part of the disk cassette showing an erroneous erase preventing detent formed on the cassette cover.

In this embodiment, moreover, there is provided an erroneous erase preventing mechanism at one corner of the cassette cover 22 so that the information recorded on the flexible magnetic disk 21 may not be erased by mistake. That is, as shown in FIG. 3 and FIG. 11, a channel-shaped cutout portion 46 is provided at a predetermined corner of the lower half 22b of the cassette cover 22, and within the cutout portion 46 an erroneous erase preventing detent 47 is connected integrally with the lower half 22b through a thin portion 49 formed by a V-shaped groove 48. On the inner surface on the tip end side (free end side) of the detent 47 there is integrally formed an abutment 50 extending toward the upper plate 22c of the upper half 22a and the tip end of the abutment 50 is in contact with the inner surface of the upper plate 22c. Accordingly, even when there is exerted an urging force in the direction of arrow C in FIG. 11, the erroneous erase preventing detent 47 is not separated from the lower half 22b. If it is desired to separate the detent 47 from the lower half 22b for the prevention of an erroneous erase, a pivotal force may be applied in the direction of arrow D in FIG. 11 to the tip end of the detent 47 whereby the thin portion 49 can be cut easily to remove the detent 47 by folding. The reason for such a construction is that in the thin cassette cover 22 it is restricted, by thickness, to push and fold off the detent 47 inwardly. The construction as in this embodiment permits the detent 47 to be folded off surely and easily.

At the two corner portions on the side of the opening 37 of the lower half 22b and in positions outwardly deviated from the ribs 34, there are formed a pair of positioning holes 51 for positioning the cassette cover 22 when the disk cassette 26 is installed onto the recording and/or reproducing apparatus. In this embodiment, moreover, auto loading cutout portions 54 and 55 have a semicircular section are formed in both side portions of the cassette cover 22. Within the cutout portions 54 and 55 there are inserted a pair of supporting rods (not shown) of a predetermined moving mechanism for holding the cassette cover 22 and moving the latter automatically to a predetermined position as necessary. Consequently, by utilizing the auto loading cutout portions 54 and 55, it is possible to construct the apparatus so that there can be performed an automatic change of the disk cassette 26 and an automatic cassette take-out operation at the time of quality inspection.

The following description is now provided with reference to FIG. 12 to FIG. 28 concerning the structure of the recording and/or reproducing apparatus onto which the disk cassette 26 is installed.

Figure 12:
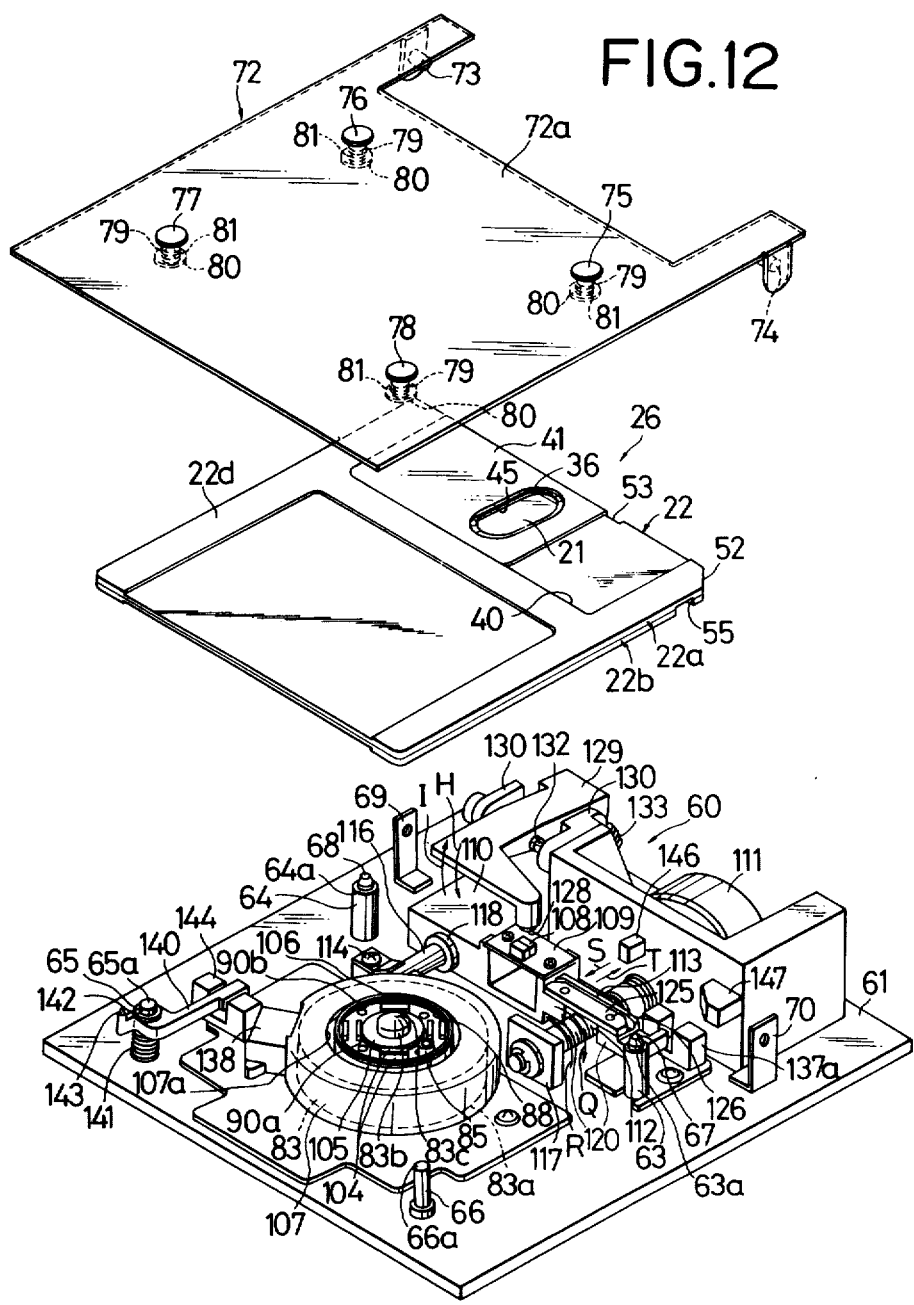
FIG. 12 is an exploded perspective view showing the disk cassette and a main part of a recording and/or reproducing apparatus according to the embodiment of this invention, onto which is to be installed the disk cassette.
Figure 13:
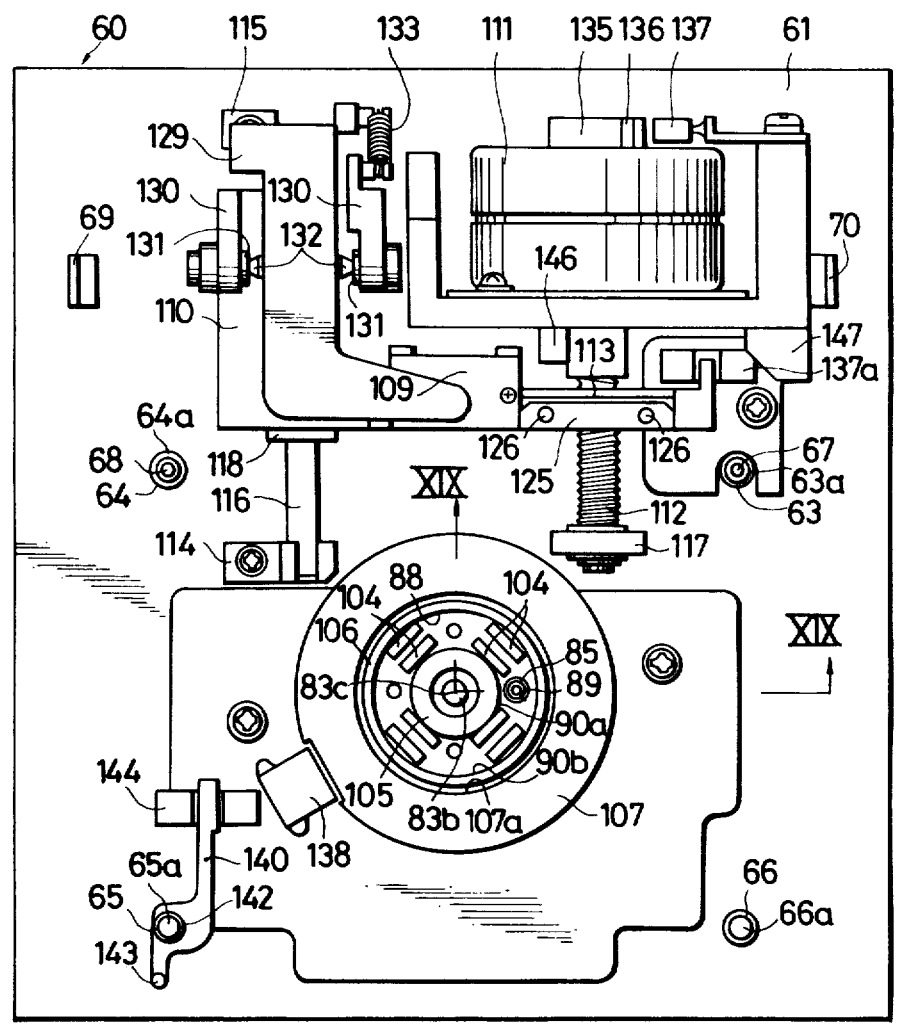
FIG. 13 is a plan view of the above apparatus with a cassette pressure member removed.
Figure 14:
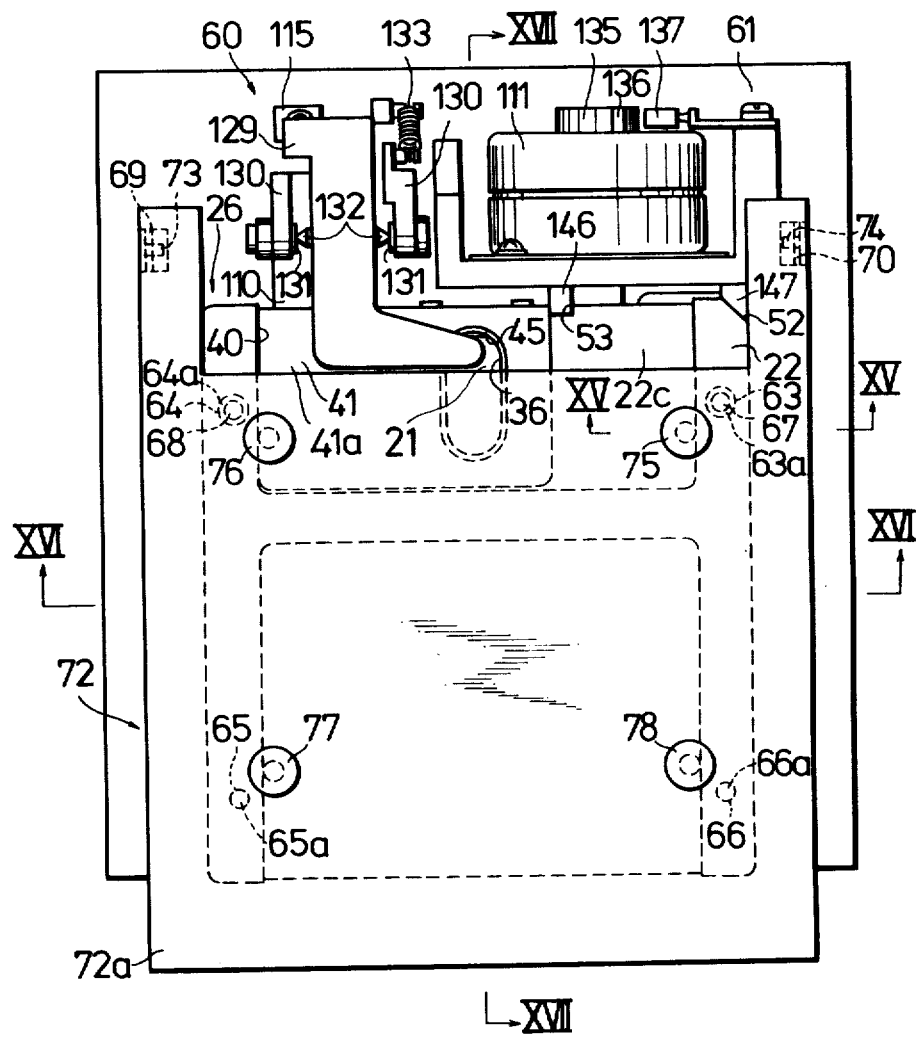
FIG. 14 is a plan view of the apparatus with the cassette pressure member.

As shown in FIG. 12 to FIG. 14, on a chassis 61 of a recording and/or reproducing apparatus (hereinafter referred to simply as the "apparatus") 60 there are mounted four cassette receiving pins 63, 64, 65 and 66 for receiving the disk cassette 26. Among these pins, on the upper ends of the two pins 63 and 64 there are integrally formed cassette positioning projections 67 and 68 respectively adapted to fit in the pair of positioning holes 51 formed in the cassette cover 22. The cassette receiving pins 63, 64, 65 and 66 are respectively provided at their upper ends with receiving surfaces 63a, 64a, 65a and 66a, which are equal in height with respect to the chassis 61.

Figure 15:
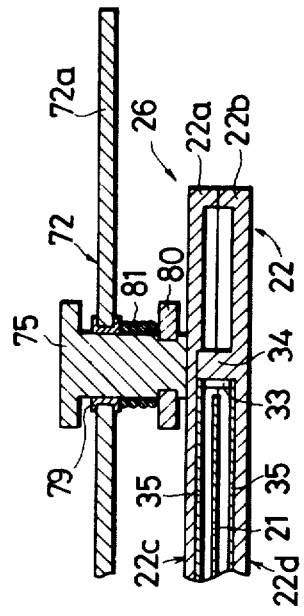
FIG. 15 is a sectional view taken on line XV—XV of FIG. 14.
Figure 16:
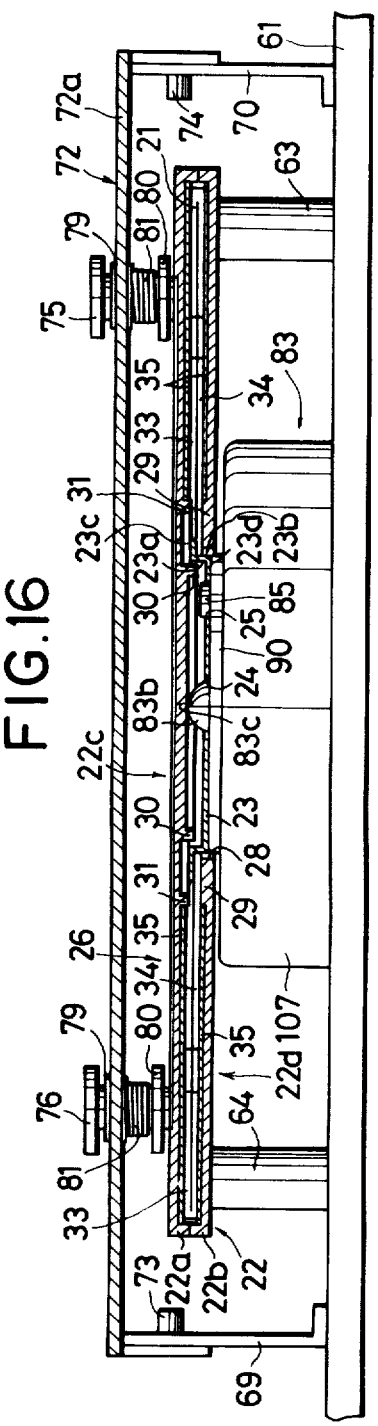
FIG. 16 is a sectional view taken on line XVI—XVI of FIG. 14.
Figure 17:
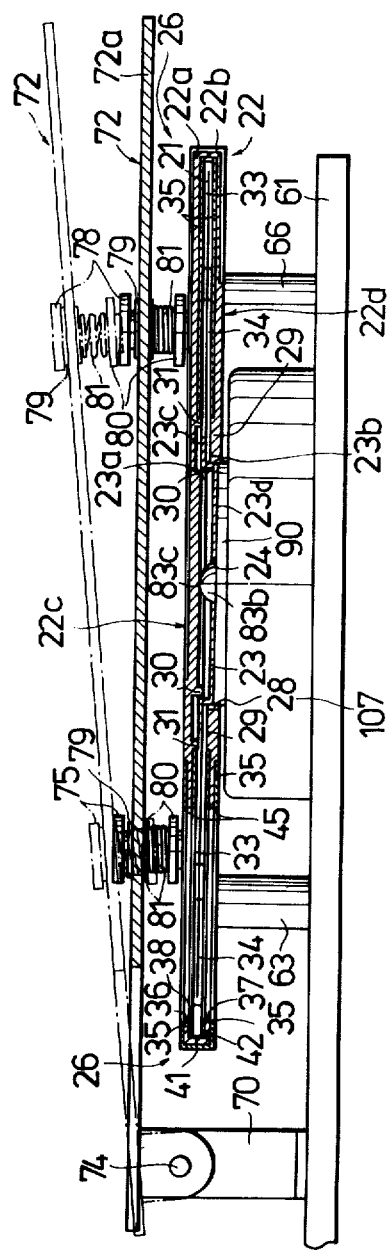
FIG. 17 is a sectional view taken on line XVII—XVII of FIG. 14.

Onto the chassis 61 there are fixed a pair of L-shaped supporting members 69 and 70, to which a cassette pressure member 72 is attached by pivots 73 and 74, respectively. The cassette pressure member 72 has a plate body 72a, and four cassette pressing pins 65, 76, 77 and 78 mounted on the lower surface of the plate body 72a. That is, as shown in FIG. 15 to FIG. 17, these pins 75 to 78 are slidably supported in the vertical direction by a sleeve 79 provided in the plate body 72a and at the same time are normally biased resiliently downwards by a compression coiled spring 81 interposed between the sleeve 79 and a spring shoe 80. Accordingly, the disk cassette 26 is pressed for holding toward the cassette receiving pins 63, 64, 65 and 66 by the cassette pressing pins 75, 76, 77 and 78.

In this embodiment, as is apparent from FIG. 14, the disk cassette 26 is received at its four corners by the cassette receiving pins 63, 64, 65 and 66. On the other hand, the positions wherein the cassette pressing pins 75, 76, 77 and 78 of the cassette pressure member 72 hold down the disk cassette 26 are each deviated by a predetermined length from the positions of the pins 63, 64, 65 and 66 toward the central side of the disk cassette 26. That is, the cassette pressing pins 75 and 77 are disposed nearly on a line joining the cassette receiving pins 63 and 65 and are disposed between these pins 63 and 65, and are so constructed as to be in corresponding relation to the ribs 33 and 34 of the disk cassette 26. The cassette pressing pins 76 and 78 and the cassette receiving pins 64 and 66 are disposed also in the same relation as above.

Figure 18:
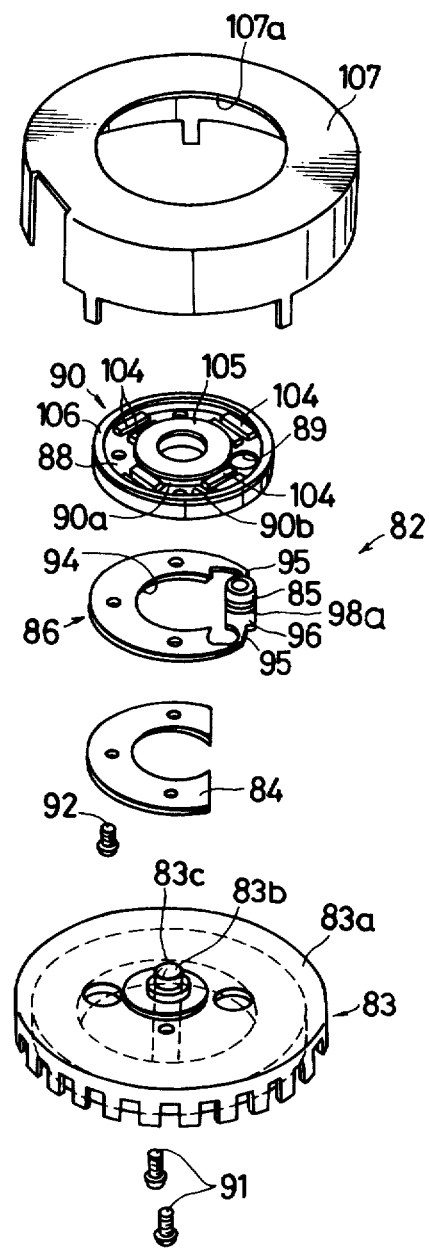
FIG. 18 is an exploded perspective view showing a mounting state of a rotor of a motor, a spacer, a leaf spring to which is attached a spring-biased driving pin, a yoke, and a motor cover.

On the chassis 61 there also is mounted a driving mechanism 82 for rotating the flexible magnetic disk 21 in the disk cassette 26. At a nearly central position of the portion surrounded with the cassette receiving pins 63, 64, 65 and 66, there is mounted a flat-type brushless motor 83 for rotating the flexible magnetic disk 21 in the disk cassette 22. As shown in FIG. 18, on the upper surface of a rotor 83a of the motor 83, a spacer 84 is positioned in the form of a partially cutout ring-like disk along with a leaf spring member 86 to which is fixed a spring-biased driving pin 85 for positioning (centering) the flexible magnetic disk 21.

In the cassette cover 22, a disk-like yoke 90 having a ring-like recess 88 formed in the upper surface thereof is tightened together with a pair of setscrews 91. The leaf spring member 86 is interposed between the spacer 84 and the yoke 90. The spacer 84, the leaf spring member 86, and the yoke 90 are further tightened together with a setscrew 92, so that these components are rotated together with a motor shaft 83b of the motor 83.

Figure 19:
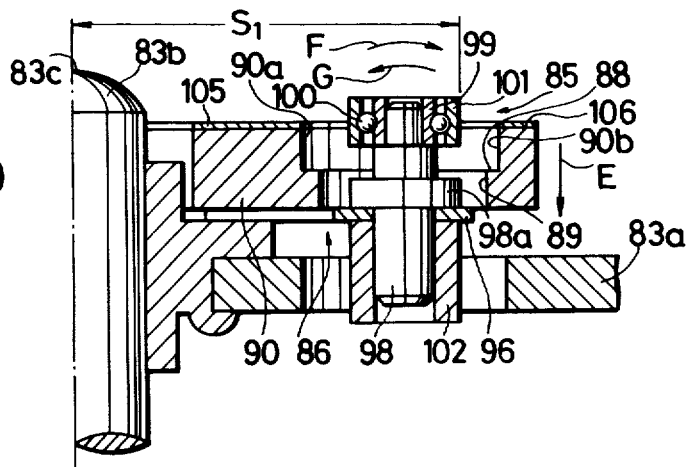
FIG. 19 is a sectional view taken on line XIX—XIX of FIG. 13.
Figure 20:
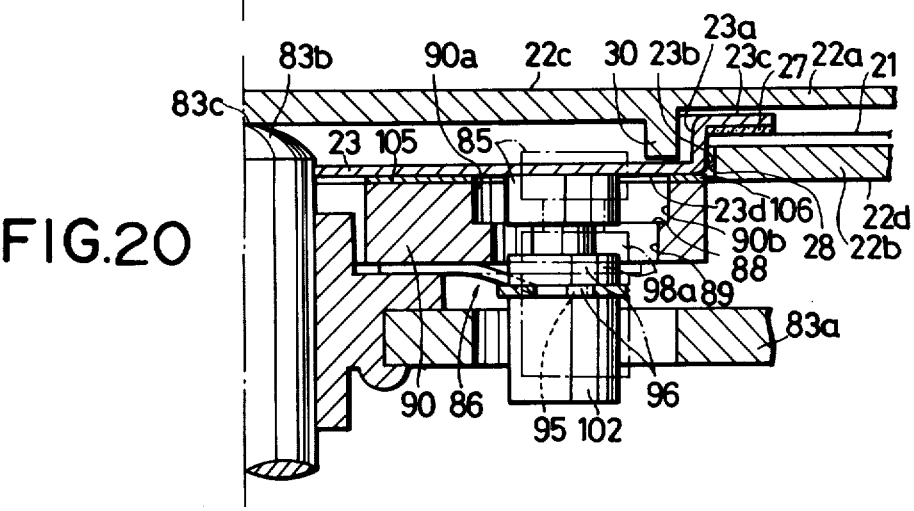
FIG. 20 and FIG. 21 are sectional views similar to FIG. 19 illustrating the operation of the spring-biased driving pin.
Figure 21:
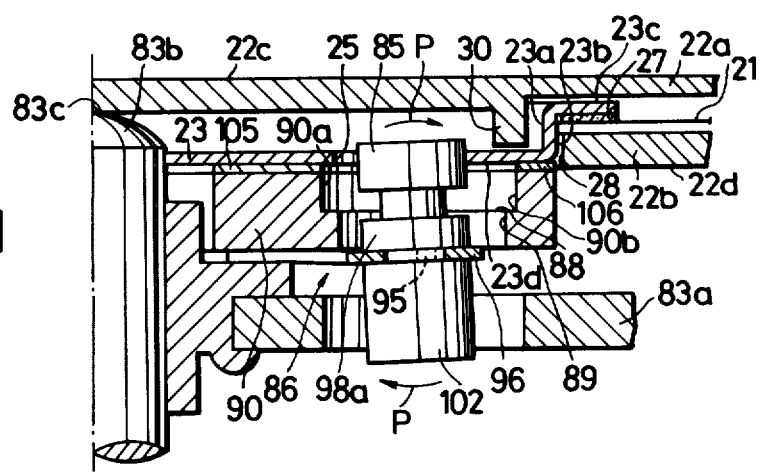

In a nearly central part of the leaf spring member 86, as shown in FIG. 18 there is formed a generally horseshoe-shaped opening 94. A pin mounting portion 96 is also integrally formed with a pair of narrowly formed L-shaped arm portions 95, the pin mounting portion 96 being supported from both sides by the pair of arm portions 95. The driving pin 85 is fixed to the pin mounting portion 96. The spring-biased driving pin 85, as shown in FIG. 19 to FIG. 21, is constructed of a stem portion 98 having a nearly centrally located flange 98a, a bearing portion 99 fitted and fixed over the upper end portion of the stem portion 98, and a cylindrical portion 101 mounted rotatably with respect to the stem portion 98 by means of a ball bearing 100 disposed between the bearing portion 99 and the cylindrical portion 101. The stem portion 98 extends through the pin mounting portion 96. On the lower end portion of the extending portion of the stem portion 98 there is fixed a cylindrical mounting member 102. By the flange 98a of the stem portion 98 and the mounting member 102, the pin mounting portion 96 of the leaf spring member 86 is held in place whereby the spring-biased driving pin 85 is secured to the pin mounting portion 96. The pin 85 is disposed in such a state that the cylindrical portion 101 of the pin 85 has passed through a piercing hole 89 formed in the recess 88 of the yoke 90. Consequently, within the piercing hole 89, the pin 85 is capable of being moved in the direction of arrow E in FIG. 19 by the resilience of the leaf spring member 86, and particularly it is pivotable in the direction of arrows F and G centered on the arm portion 95 in FIG. 19 (in other words, it is movable in the radial direction of the yoke 90). The pin 85 is mounted in such a position that the distance $S_1$ shown in FIG. 19 is slightly longer than the distance $S_2$ shown in FIG. 28.

A top portion 83c of the motor shaft 83b of the motor 83 is generally hemispherical, and the height of the top portion 83c of the motor shaft 83b is set to a predetermined level. As will be described in detail later, in case the upper plate 22c of the cassette cover 22 warps to the lower plate 22d when installing the disk cassette 26 onto the apparatus 60, the top portion 83c engages the inner surface of the upper plate 22c to correct the inward warp of the latter.

On the other hand, in the recess 88 of the yoke 90 four pairs of magnets 104 are fixed with an adhesive or the like at nearly equal intervals in the circumferential direction. On the upper surfaces of inner and outer flanges 90a, 90b of the yoke 90 there are stuck lubricant sheets 105, 106 respectively consisting of a Teflon (trademark of DuPont deNemours & Co.), sheet or the like incorporating carbon. As shown in FIG. 19 to FIG. 21, the upper surfaces of the lubricant sheets 105 and 106 (i.e., the receiving surfaces for the center core disk 23) are positioned to be flush with each other and above the upper surfaces of the magnets 104. The cylindrical portion 101 of the pin 85 is in an upwardly projecting state from the upper surfaces of the lubricant sheets 105 and 106.

In FIG. 12 and FIG. 13, the reference numeral 107 is a motor cover having an opening 107a formed in the upper surface thereof. Within the opening 107a, and the lubricant sheets 105 and 106 stuck on the yoke 90 are projecting upwardly from the upper surface of the motor cover 107.

Next, an explanation will be given concerning a head moving unit in the apparatus 60.

The head moving unit includes a head support 110 onto which a magnetic head 108 is secured on a mounting plate 109, together with a feed screw 112 which is driven by a step motor 111 about the axis thereof. As shown in FIG. 12 to FIG. 14, the step motor 111 is screwed to a vertical piece 113 of the chassis 61, and a motor shaft 111a of the step motor 111 is directly connected to the feed screw 112. The other end of the feed screw 112 is rotatably attached to a cut-up piece 112 of the chassis 61. The feed screw 112 is disposed horizontally with respect to the chassis 61.

In this embodiment, the head support 110 is constructed so as to be movable along the axis of the feed screw 112. That is, a pair of guide shaft mounting portions 114, 115 are provided on the chassis 61, and both end portions of a guide shaft 116 having a circular section are fixed to the mounting portions 114 and 115. The guide shaft 116, which is disposed in parallel with the feed screw 112, extends through the head support 110 and in this state it is borne by a sleeve 118 fixed to the head support 110. Consequently, the head support 110 is slidable while being guided by the guide shaft 116 in the direction of arrows S and T in FIG. 12 and FIG. 24.

Figure 22:
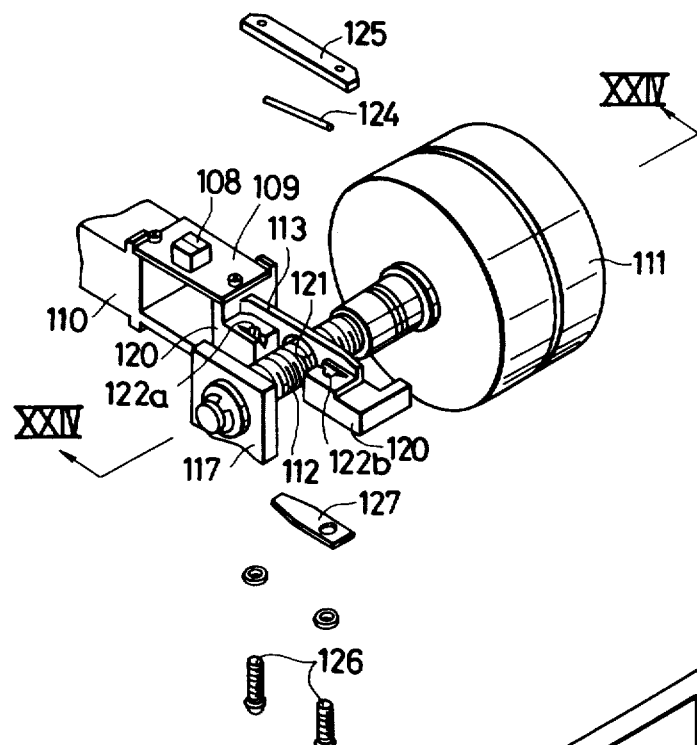
FIG. 22 is an exploded perspective view of a main part of a head moving mechanism.
Figure 24:
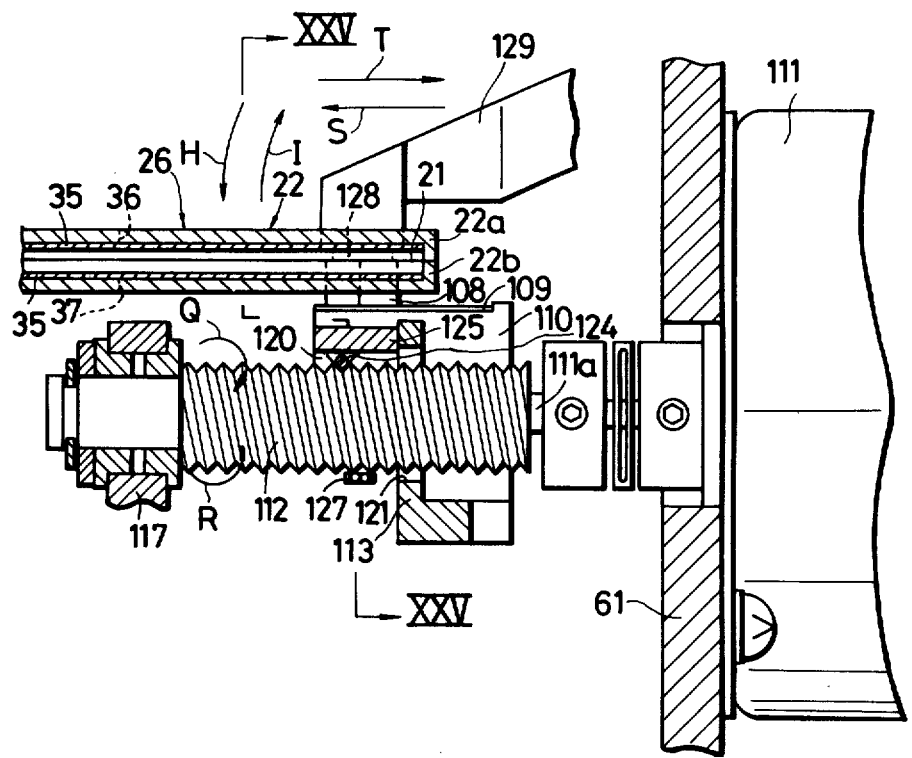
FIG. 24 is a sectional view taken on line XXIV—XXIV of FIG. 22.
Figure 25:
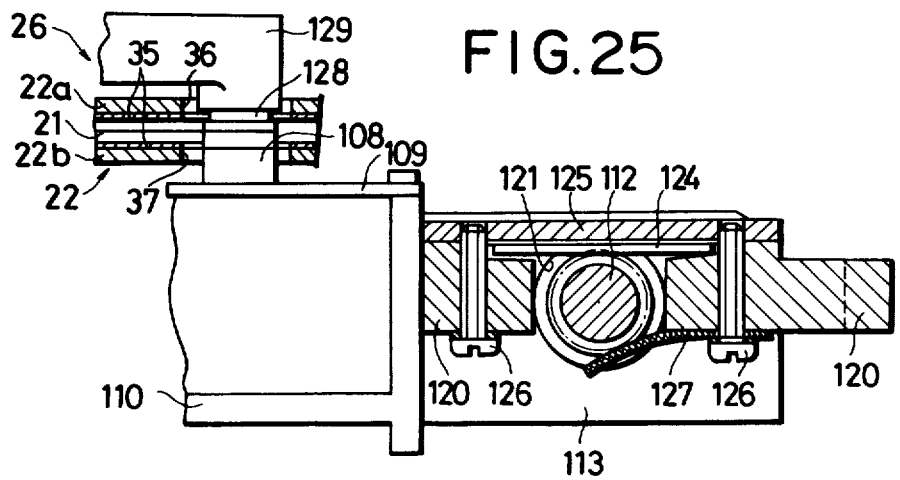
FIG. 25 is a sectional view taken on line XXV—XXV of FIG. 24.

With the head support 110, as shown in FIG. 12 and Fig. 22, there is integrally formed a pair of needle-like member mounting portions 120 which are opposed to each other in spaced relation. The feed screw 112 extends through an opening 121 formed in the vertical piece 113 of the head support 110, and is disposed between the pair of needle-like mounting portions 120. In the upper surfaces of the pair of mounting portions 120 there are formed V-shaped grooves 122a and 122b respectively, the V-shaped grooves 122a and 122b having an inclination corresponding to the pitch angle of the threaded portion of the feed screw 112 in the direction orthogonal to the axis of the feed screw 112 and extending on the same straight line. A needle-like member 124 is spanned between the pair of mounting portions 120 with its end portions inserted in the V-shaped grooves 122a and 122b. Furthermore, as shown in FIG. 24, it is inserted without looseness between and along adjacent threads (i.e., the root) of the feed screw 112. Above the needle-like member 124 there is disposed a keep plate 125 which is fixed onto the upper surfaces of the mounting portions 120 with a pair of setscrews 126 whereby the needle-like member 124 is secured to the mounting portions 120 in the aforesaid state of arrangement. Furthermore, as shown in FIG. 25, a leaf spring 127 is fixed to the lower surface of one mounting portion 120 with the setscrew 126, and by virtue of a resilient restoring force of the free end of the leaf spring 127, the feed screw 112 is normally urged to the needle-like member 124 and the threaded portion of the feed screw 112 never become disengaged from each other, and the needle-like member 124 is kept engaged without looseness between adjacent threads.

On the head support 110, as shown in FIG. 12 and FIG. 24, there is pivotablY mounted a pad supporting member 129 which holds a pad 128 formed of felt or the like. More specifically, on the head support 110 there are mounted a pair of opposed vertical pieces 130 extending in the direction perpendicular to the chassis 61, and bearing 131 is fixed to each of the vertical pieces 130 (see FIG. 12 and FIG. 13). Furthermore, pivots 132 fixed to the pad supporting member 129 are borne by the bearings 131, while between one vertical piece 130 and the head support 110 there is stretched a compression coiled spring 133. Accordingly, the head support 110 is normally urged around the pivots 132 in the direction of arrow H in FIG. 12 and FIG. 24, namely in the direction in which the pad 128 comes into pressure contact with the magnetic head 108. When the disk cassette 26 is not installed on the apparatus 60, the head support 110 is urged in the direction of arrow I in FIG. 12 against the urging force of the compression coiled spring 133 by means of a predetermined urging mechanism such as a plunger solenoid (not shown), so that the pad 128 is spaced from the magnetic head 108. That is, the state of the apparatus 60 shown in FIG. 12 is for the case when the disk cassette 26 is not installed or not in operation. When the disk cassette 26 has been installed or in operation, the head support 110 is pivotally moved in the direction of arrow H by virtue of the urging force of the compression coiled spring 133. As a result, as shown in FIG. 24, the magnetic disk 21 exposed to the openings 36 and 37 in the cassette cover 22 is held between the pad 128 and the magnetic head 108.

Figure 23:
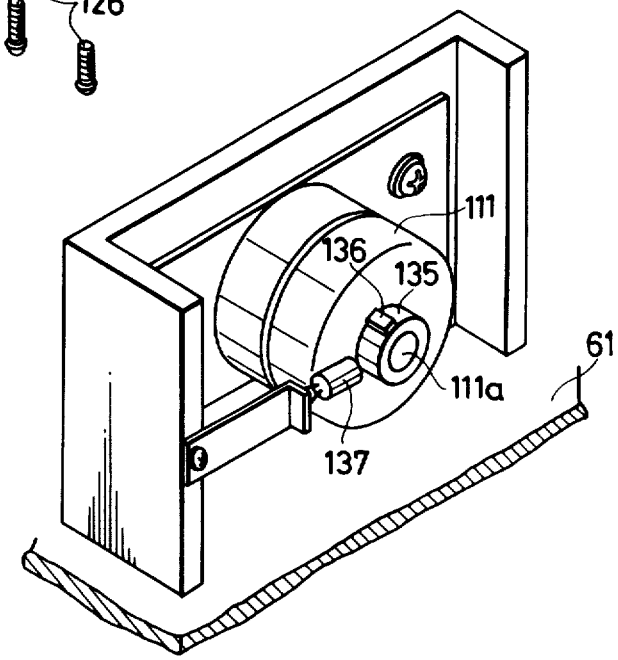
FIG. 23 is a perspective view of a rotational position detecting mechanism for the motor shaft of a step motor.

Referring now to FIG. 23, a disk 135 made of a synthetic resin or the like is coaxially fixed onto the other end of the motor shaft 111a of the step motor 111, and a reflector 136 is mounted on a part of the peripheral surface of the disk 135. On the other hand, a detector 137 consisting of a light emitting element and a light receiving element (photo sensor) is disposed in opposed relation to the outer peripheral surface of the disk 135. A rotational position of the motor shaft 111a of the step motor 111 is detected by the function of the detector 137 and the reflector 136. A detection mechanism 137a for detecting a movement position of the head support 110 with respect to the feed screw 112, is mounted near both ends of the feed screw 112. On the basis of detection signals from this detection mechanism 137a and the detector 137, rotation start and stop positions of the motor shaft 111a are determined as will be described later. As a result, the magnetic head 108 can be moved by only an amount of movement required for the magnetic disk 21 to be recorded or reproduced by the magnetic head 108 (namely within a predetermined range of movement). The reference numeral 138 in FIG. 12 is an optical pulse generator for detecting a rotational phase of the flat-type brushless motor 83.

Figure 26:
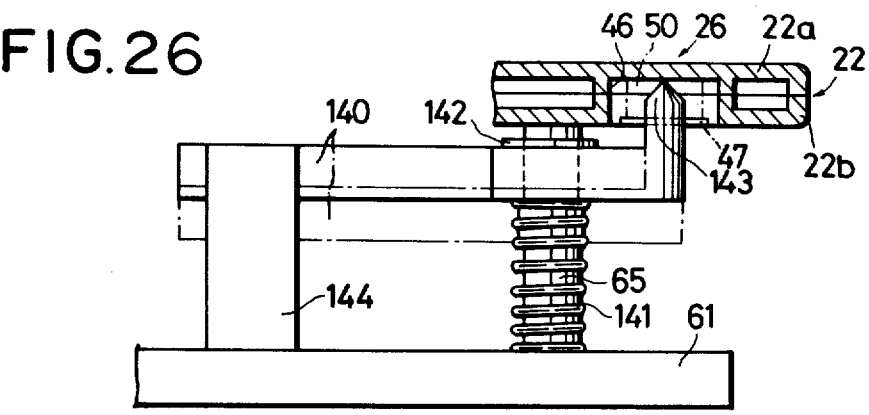
FIG. 26 is a longitudinal sectional view of a main part illustrating a correlative operation between the erroneous erase preventing detent of the disk cassette and an erroneous erase preventing detent detection member.

On the cassette receiving pin 65, as shown in FIG. 12 and FIG. 26, there is mounted an erroneous erase preventing detent detecting member 140 movable along the axis of the pin 65. The detecting member 140 is provided at one end thereof with an upwardly projecting detector portion 143. The detecting member 140 is normally urged upwards by a compression coiled spring 141 and is retained by a stopper 142 mounted on the upper end portion of the pin 65. On the other hand, a detector 144 incorporating therein a light emitting element and a light receiving element (neither shown) disposed in opposed relation to each other, is attached to the chassis 61. The detector 144 is constructed so that the other end portion of the detecting member 140 can get in between the light emitting and receiving element along with a downward movement of the detecting member 140. That is, while the detecting member 140 is retained to the stopper 142 by the compression coiled spring 141, the other end portion of the detecting member 140 is spaced upwards from between the light emitting and receiving element. When the detector portion 143 of the detecting member 140 has been forced down by the erroneous erase preventing detent 47 of the cassette cover 22, the other end portion of the detecting member 140 gets in between the light emitting and receiving elements against the urging force of the compression coiled spring 141, whereby the recording operation is performed in the above case. Otherwise, recording is prevented as will be described later.

In this embodiment, in order to prevent an erroneous installation (loading) of the disk cassette 26 onto the apparatus 60, there are formed erroneous installation preventing projections 146 and 147 on the chassis 61 side in opposed relation to the channel-shaped cutout portion 53 and the triangular cutout portion 52 both formed in the disk cassette 26, respectively.

Next, the following description is now provided about the operation of the apparatus 60 having the above construction.

First, the shutter 41 of the disk cassette 26 to be installed onto the apparatus 60 is slid in the direction of arrow A in FIG. 6 until the openings 36 and 37 of the disk cassette 26 and the opening 45 of the shutter 41 are overlapped with each other, whereby the openings 36 and 37 are opened and at the same time the channel-shaped cutout portion 53 of the disk cassette 26 is opened. Thereafter, the disk cassette 26 is installed onto the apparatus 60 by means of a cassette loading mechanism, not shown. In this case, as shown in Fig. 14, the erroneous installation preventing projections 146 and 147 of the chassis 61 can get in the channel-shaped cutout portion 53 and the triangular cutout portion 53 of the disk cassette 26, respectively, so that the cassette cover 22 can be disposed in the normal loading position, and the disk cassette 26 is placed on the cassette receiving pins 63, 64, 65 and 66 by means of the cassette loading mechanism. In this case, the projections 67 and 68 of the cassette receiving pins 63 and 64 are respectively fitted into the positioning holes 51 and 52 formed in the cassette cover 22, whereby the positioning of the disk cassette 26 is effected in its planar direction, i.e., longitudinal and transverse direction. At the same time, the cassette pressure member 72 moves pivotally about the pivots 73 and 74 in interlock with the cassette loading mechanism, thus allowing the pins 75, 76, 77 and 78 of the cassette pressure member 72 to force the disk cassette elastically downwards by virtue of the urging force of the compression coil springs 81. Accordingly, the disk cassette 26 is held resiliently between the pins 63, 64, 75 and 66 and the pins 75, 76, 77 and 78 of the pressure member 72 whereby the positioning of the disk cassette 26 in the direction of the height is effected.

When installing the disk cassette 26, in case the cutout portion 53 is covered with the shutter 41, or in case the triangular cutout portion 52 is not disposed in the normal position (that is, in case the loading direction of the disk cassette 26 is not correct), since corner portions of the shutter 41 and the disk cassette 26 will strike against the projections 146 and 147, the disk cassette 26 is not disposed in the foregoing normal loading position. Consequently, the foregoing loading operation is not performed and hence recording and reproducing operations are not carried out. It is, therefore, not possible that the magnetic head 108 will be damaged upon its abutment with the shutter 41 which covers the opening 37 of the disk cassette 26.

On the other hand, the portion of the disk cassette 26 where the openings 36 and 37 are formed is inserted between the magnetic head 108 and the pad 128. For interlock during loading operation of the disk cassette 26 by means of the loading mechanism, not shown, the pad supporting member 129 is pivotally moved in the direction of arrow H in FIG. 12 and FIG. 24 by virtue of the urging force of the compression coiled spring 133. It thus results in that a part of the flexible magnetic disk 21 exposed through the opening 45 in the shutter 41, the openings 36 and 37 in the cassette cover 22, and the opening 38 in the non-woven fabrics 35 is held between the magnetic head 108 and the pad 128.

In this case, if the erroneous erase preventing detent 47 of the disk cassette 26 has not been folded off or removed, the detector portion 143 of the detecting member 140, as indicated with a dot-dash line in FIG. 26, is forced down against the urging force of the compression coiled spring 141 by the detent 47, thereby allowing the gap between the light emitting and receiving elements of the detector 144 to be interrupted. As a result, the apparatus 60 is ready to perform recording and reproducing operations on the basis of a predetermined signal from the detector 144. On the other hand, in case the detent 47 has been folded off, the tip end of the detector portion 143 of the detecting member 140 can get into the cutout portion 46 of the cassette cover 22. Therefore, the detecting member 140 is left to be disposed in the upper position by virtue of the compression coiled spring 141, so that the gap between the light emitting and receiving elements of the detector 144 is not interrupted and hence the apparatus 60 is maintained in a state which will not perform a reproducing operation on the basis of a predetermined signal from the detector 144.

Along with such a loading operation of the disk cassette 26, the motor shaft 83b is inserted in the center aperture 24 of the center core disk 23 fitted in the driving hole 28 of the lower half 22b of the disk cassette 26. In this case, if the upper plate 22c of the loaded disk cassette 26 is warped (bent) toward the lower plate 22d as indicated with a dot-dash line in FIG. 27, the hemispherical top 83c of the motor shaft 83b comes into contact with the nearly central part of the inner surface of the upper plate 22c by the pins 75, 76, 77 and 78. As a result, when the loading of the disk cassette 26 is over, the deformation (inward warp) of the upper plate 22a is already corrected and the upper plate 22a is flat, as indicated with a solid line in FIG. 27.

On the other hand, when the disk cassette 26 has been installed, the pressing position of the pins 75, 76, 77 and 78 of the pressure member 72 are on the diagonal lines of the pins 63, 64, 65 and 66 as previously noted; these positions correspond to the ribs 33 and 34 of the disk cassette 26. Therefore, if the lower plate 22d of the disk cassette 26 to be installed is deformed inwardly, namely toward the upper plate 22c as indicated with a dot-dash line in FIG. 27, the lower plate 22d undergoes a force in the direction of arrows L and M through the ribs 33 of the upper half 22a and the ribs 34 of the lower half 22b. It thus results that the deformation of the lower plate 22d becomes flat as indicated with a solid line in FIG. 27.

In this embodiment, as set forth above, even if the upper and lower plates 22c and 22d both are warped (deformed) inwardly, this warp (deformation) can be corrected to a satisfactory extent. As a result, the space within the cassette cover 22 when installed can always be maintained constant, there is no fear of an obstacle to the rotation of the magnetic disk 21, and the flexible magnetic disk 21 can be rotated with a relatively small driving torque.

Along with the aforesaid installation (loading) of the disk cassette 26, the center core disk 23 is attracted by the magnets 104 of the yoke 90 and is disposed on the lubricant sheets 105 and 106 respectively stuck on the upper surfaces of the flanges 90a and 90b of the yoke 90. In this case, if the position of the driving and positioning aperture 25 in the center core disk 23 and that of the spring-biased pin 85 are shifted from each other, the pin 85 is forced down by the center core disk 23 by virtue of the attractive force exerted between the center core disk 23 and the magnets 104. As a result, as shown with a solid line in FIG. 20, the pin 85 is forced down against the resilient restoring force of the leaf spring 86, particularly the arm portion 95. In such a state, when the apparatus 60 is changed to the recording or reproducing mode and the motor shaft 83b of the motor 83 is rotated, the pin 85 rotates together with the leaf spring 86 and the yoke 90 with respect to the center core disk 23. At this time, the flexible magnetic disk 21 is held between the magnetic head 108 and the pad 128 as previously noted, whereby load torque is exerted on the magnetic disk 21. Consequently, even if a frictional force is exerted between the lubricant sheets 105 and 106 stuck on the yoke 90 and the center core disk 23, and between the latter and the pin 85, the center core disk 23 is not rotated and the pin 85 moves around relatively to the stationary center core disk 23. Thereafter, when the driving and positioning aperture 25 in the center core disk 23 is reached, as indicated with a dot-dash line in FIG. 28, the cylindrical portion 101 of the pin 85 gets in the aperture 25 by virtue of the resilient restoring force of the leaf spring 86. Then, as the motor shaft 83b rotates in the direction of arrow N, the pin 85 is further moved around and the cylindrical portion 101 of the pin 85 comes into engagement first with a positioning edge a located farther from the motor shaft 83b out of a pair of longer edges of the aperture 25. Then the pin 85 is further moved around and comes into engagement with a driving edge 25b of the aperture 25 while the cylindrical portion 101 of the pin 85 is rotated with the ball bearing 100 since a holding force induced by the magnetic head 108 and the pad 128 and an inertia force caused by the difference in revolution between the yoke 90 and the center core disk 23, are exerted as a load torque on the magnetic disk 21 and the center core disk 23. In this case, as previously noted, since the distance S1 shown in FIG. 19 is set slightly longer than the distance S2 shown in FIG. 28, the pin 85 is brought into an inclined state by a torsional deformation of the arm portion 95 of the leaf spring 86 as illustrated in FIG. 21. As a result, the axis of the pin 85 now has a slight inclination with respect to the vertical direction in FIG. 21, so that on the center core disk 23 there normally is exerted an urging force in the direction of arrow P in FIG. 21 and FIG. 28 through the cylindrical portion 101 of the pin 85 by virtue of the resilient restoring force of the arm portion of the leaf spring 86.

Figure 28:
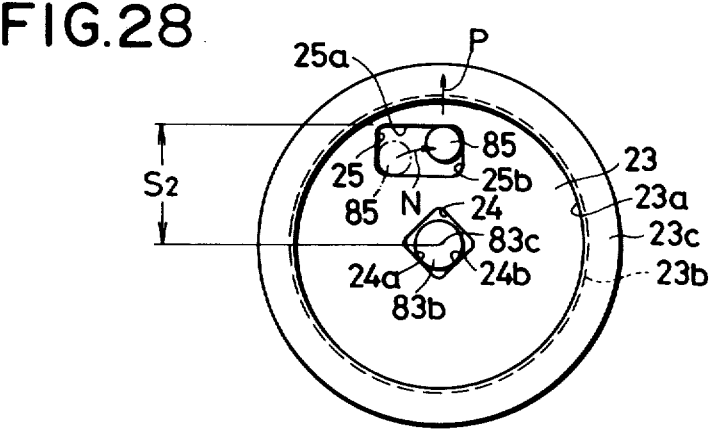
FIG. 28 is a plan view of the center core disk in a positioned state with the motor shaft and a spring-biased driving pin respectively inserted in the motor shaft insertion opening and the spring-biased driving pin insertion opening both formed in the center core disk.

Although the load torque applied to the flexible magnetic disk 21 by the magnetic head 108 and the pad 128 is small, the provision in this embodiment of the ball bearing 100 between the stem portion 98 and the cylindrical portion 101 allows the pin 85 to be sure to move to the predetermined position indicated with a solid line in FIG. 28, even if the forming accuracy of the insertion apertures 24 and 25 in the center core disk 23 is not very high.

As the center core disk 23 is moved in the direction of arrow P, two sides 24a and 24b of a V-shaped corner located farther from the driving and positioning aperture 25 out of four sides of the motor shaft insertion aperture 24 are brought into pressure contact at two points with the motor shaft 83b, and the center core disk 23 is positioned. Accordingly, the center of the flexible magnetic disk 21 stuck on the center core disk is positioned nearly on the axis of the motor shaft 83b. In this state, as the motor shaft 83b rotates and the pin 85 is moved around in the direction of arrow N in FIG. 28, the cylindrical portion 101 of the pin 85 pushes the driving edge 25b of the aperture 25 so that the center core disk 23 and hence the magnetic disk 21 is rotated in the direction of arrow N. In this case, since the flexible magnetic disk 21 is disposed concentrically with the motor shaft 83b as previously noted, it is rotated in an almost centered state.

Next, an explanation is here given about the operation of the head moving mechanism. First, when the apparatus 60 is changed, for example, to the reproducing mode in a loaded state of the disk cassette 26 in the manner as set forth hereinbefore, the flexible magnetic disk 21 rotates in the previously described manner. Along with this rotation, a recorded information is read-out by the magnetic head 108 which is in sliding contact with the recording surface of the flexible magnetic disk 21, and a synchronizing signal contained in the read-out information is supplied to a step motor driving circuit (not shown). Every time such a synchronizing signal is supplied, a predetermined driving current is provided from the above driving circuit to the step motor 111, whereby the motor shaft 111a is rotated in the direction of arrow Q (shown in FIG. 12 and FIG. 24) in steps by a predetermined rotational c angle (e.g., 15°). Along with this rotation of the motor shaft 111a, the needle-like member 124 inserted without looseness between adjacent threads of the feed screw 112 is moved in the direction of arrow S by the feed screw 112. Thereby the head support 110, together with the needle-like member 124 is guided by the guide shaft 116 and moves stepwise to the next circular recording track intermittently, namely at every rotation of flexible magnetic disk head 108 and the pad supporting member 129 both mounted on the head support 110 slide integrally with each other and with the flexible magnetic disk 21 held therebetween, and move intermittently in the longitudinal direction within the head and pad insertion openings 36 and 37 in the disk cassette, namely along a radial direction of the flexible magnetic disk 21.

In this embodiment, as the pitch of the feed screw 112 is relatively small and the step motor 111 has a relatively large rotational angle (e.g., about 15°) per one step, even if the recording track pitch on the flexible magnetic disk 21 is small, it is possible to effect positioning of the magnetic head 108 with high accuracy with respect to the recording track to be reproduced. This is because even if step motors have the same mechanical accuracy in a single step rotation, the ratio of this mechanical accuracy to the one step rotational angle is smaller in a step motor having a wider rotational angle, and therefore, the magnetic head 108 can be moved with high accuracy.

During the above movement, the feed screw 112 undergoes a downward force in FIG. 24 and FIG. 25 through the needle-like member 124. But since an urging force toward the needle-like member 124 is exerted at all times on the feed screw 112 by means of the leaf spring 127, the threads of the feed screw 112 and the needle-like member 124 will never become disengaged.

In this way, the magnetic head 108 in sliding contact with the flexible magnetic disk 21 moves stepwise and radially from the outer peripheral side toward the center of the magnetic disk 21 at every rotation of the motor shaft 83b, namely every time there is fed a synchronizing signal recorded on each circular recording track. When the head support 110 has been moved to a predetermined position and the magnetic head 108 has reached near the inside terminal edge portion of the magnetic surface of the flexible magnetic disk 21, the position of the head support 110 is detected by a detection mechanism 117a. Then, when the detector 137 and the reflector 136 have become opposed to each other along with the rotation of the motor shaft 111a of the step motor 111, the rotation of the motor shaft 111a in the direction of arrow N is stopped on the axis of detection signals from the above detection mechanism 117a and the detector 137. Conversely, in case the feed screw 112 has been rotated in the direction of arrow R in FIG. 12 and FIG. 24 by means of the step motor 111, the magnetic head 108 is moved from the radially central side of the flexible magnetic disk 21 toward the outer peripheral side (in the direction of arrow T in FIG. 12 and FIG. 24). And when it has reached the outside terminal edge portion of the magnetic surface, the rotation of the motor shaft 111a in the direction opposite to the previous arrow N direction is stopped.

Along with the above operation, the information recorded on the recording surface of the flexible magnetic disk 21 is reproduced. Also, in the recording operation, the same operation is performed as set forth hereinbefore.

Figure 27:
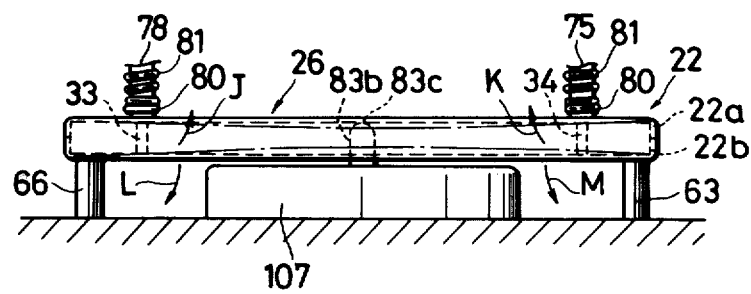
FIG. 27 is a schematic side view illustrating the principle of a correcting operation against an inward warp of upper and lower plates of the cassette cover.

According to the flexible magnetic disk cassette 26 having the above construction, the center core disk 23 is formed in the shape of a pan, and the center hollow 23a of the center core disk 23 and the projection 30 of the upper half 22a are held in a fitted state, so that even if the flexible magnetic disk 21 is displaced toward the lower half 22b due to its own weight while the disk cassette 26 is not in use, the movement of the center core disk 23 and hence of the magnetic disk 21 in their planar direction is surely restricted within a predetermined range by the engagement between the center core disk 23 and the projection 30. Consequently, it is possible to eliminate the risk that the peripheral edge portion of the flexible magnetic disk 21 might come into contact with the ribs 33 and 34 and be damaged thereby. Particularly in the case of a flat-type disk cassette, it is preferable that the movable range in the vertical direction of the center core disk 23 is as large as possible in consideration of dimensional variations of various components. In this connection, by forming the center core disk 23 in the shape of a pan as in the present embodiment, it becomes possible to accept a larger movable range than in the case of such a plate-like center core disk 6 as shown in FIG. 27.

Moreover, as previously noted, even if the upper plate 22c and the lower plate 22d of the cassette cover 22 are deformed to a certain extent in the direction away from each other because of a low mechanical strength of the cassette cover 22, the movable range of the center core disk 23 can be surely restricted. Besides, since the center core disk 23 is constructed of a thin plate, it is possible to reduce its weight as compared with a conventional plate-like center core disk, and this in turn permits the use of a small-sized low torque motor as the driving source for the magnetic disk 21.

Furthermore, when joining together the flexible magnetic disk 21 and the center core disk 23, the convexed portion 23b of the center core disk 23 serves as a guide allowing the magnetic disk 21 to be mounted with very high accuracy with respect to the center core disk 23. Consequently, the vibration of the outer part of the flexible magnetic disk 21 during rotation can be kept to a minimum.

Furthermore, the distance from the yoke 90 to the inner surface of the upper plate 22c of the upper half 22d at the time of installation of the disk cassette 26 can be relatively long. This permits the formation of a hemispherical tapered portion at the top 83c of the motor shaft 83b. As a result, even without forming an opening in the upper plate 22c in corresponding relation to the motor shaft 83b, the center core disk 23 can be fully guided by the tapered portion.

An embodiment of this invention has been described above, but the invention is not limited thereto and various modifications may be made on the basis of the technical concept of this invention.

For example, the material of the center core disk 23 is not limited to iron, and any magnetic material may be used. Furthermore, the center core disk 23 may be formed of a hard material incorporating a magnetic powder. Regarding the dimensional relation between the upper and lower halves 22a and 22b of the cassette cover 22 and the center core disk 23, the values of $L_1$ and $L_{12}$ previously shown are merely an example, which may be changed if only there exists an overlapping portion between the projection 30 of the upper half 22a and the lower half 22b. It is also possible to form the projection 30 on the lower half 22b so as to project to the upper half 22a and to insert it in the center hollow 23a of the center core disk 23.

Although the illustrative embodiments of the invention have been described in detail herein with reference to the accompanying drawings, it is to be understood that the invention is not limited to the precise embodiments, and that various changes and modifications can be effected therein by one skilled in the art without departing from the scope and spirit of the invention as defined in the appended claims.

I claim as my invention:

1. A flexible magnetic disk cassette comprising:
   (a) a flexible magnetic disk;
   (b) a center core disk having a center hollow and raised fringe, and being attached at a center of said flexible magnetic disk with said raised fringe; and
   (c) a cover having an upper half and lower half containing said flexible magnetic disk with said center core disk, said lower half having a driving hole a little larger than an outer diameter of said center hollow of said center core disk.

2. A flexible magnetic disk cassette as claimed in claim 1, wherein said upper half of said cover is provided with a ring-shaped projection having a diameter a little smaller than an inner diameter of said center hollow of the center core disk.

3. A flexible magnetic disk cassette as claimed in claim 2, wherein said raised fringe and said ring-shaped projection are so designed as to prevent said flexible magnetic disk from undesirable positioning within said cover when said flexible magnetic disk is not ready for use.

4. A flexible magnetic disk cassette comprising:
   (a) a flexible magnetic disk;
   (b) a pan-shaped one-piece center core disk of magnetic material having a center hollow and raised fringe, said center core disk being attached at a center of said flexible magnetic disk by said raised fringe; and
   (c) a cassette cover having an upper half and lower half containing said flexible magnetic disk with said center core disk, said lower half having a driving aperture larger than an outer diameter of said center hollow of said center core disk.

5. A magnetic disk cassette comprising:
   a flexible magnetic disk;
   a center core disk attached and positioned in an aperture at a center of the flexible magnetic disk;
   the center core disk having an annular center hollow; and
   a cover having an upper wall and lower wall between which the flexible magnetic disk is positioned, the upper wall having a ring-like projection receivable in the annular hollow of the center core disk when the magnetic disk is assembled in the cover, the lower wall having a driving hole for access to the center core disk by a driving mechanism.

6. A cassette according to claim 5 wherein the center core disk at least partially extends into the driving hole, the driving hole having a diameter slightly larger than an outer diameter of the annular hollow of the center core disk.

7. A magnetic disk cassette, comprising:
a flexible magnetic disk;
a center core disk having a center hollow and a ring-like raised fringe, said raised fringe providing an attachment surface means which together with an adhesive attachs the center core disk to the flexible magnetic disk in a central aperture thereof; and
a cover having an upper wall and lower wall containing the flexible magnetic disk with the center core disk, the lower wall having a driving hole positioned for permitting access to drive the center core disk from an external driving means.

8. A flexible magnetic disk cassette, comprising:
a flexible magnetic disk;
a center core disk having a center hollow and raised fringe and being attached to a center of said flexible magnetic disk with said raised fringe;
a cover having an upper half and lower half containing said flexible magnetic disk with said center core disk, said lower half having a driving hole for access by a driving means to the center core disk;
first and second disk-like cleaning fabrics positioned between the magnetic disk and the respective upper and lower walls; and
the upper and lower walls and the first and second cleaning fabrics having a magnetic head opening means therein to permit access to a recording surface of the magnetic disk by a magnetic head.

9. A flexible magnetic disk cassette system, comprising:
a cassette formed of a flexible magnetic disk having a pan-shaped center core disk forming a center hollow and outer convex portion and having a raised flange upwardly of a lower surface of the center core disk, the center core disk being attached at a center of the flexible magnetic disk with said raised fringe, and a cover having an upper wall and lower wall containing the flexible magnetic disk, the lower wall having a driving hole aligned with the center core disk, said center core disk having a central positioning aperture and an offset driving aperture; and
a driving and recording/reproducing system means for receiving the cassette, said system means having driving means engageable with the center core disk.

10. A system according to claim 9 wherein a ring-like projection extends from an inside surface of the upper wall of the cassette cover and is engageable in a center hollow of the center core disk.

11. A flexible magnetic disk cassette driving apparatus for rotating a flexible magnetic disk having a center core and positioned within the cassette, comprising:
driving means coupled with the center core of the flexible magnetic disk for rotating it at a predetermined speed;
cassette supporting means mounted on a chassis for receiving and positioning said flexible magnetic disk cassette;
cassette pressing means for depressing said cassette on said cassette supporting means; and
positioning means on said driving means for positioning an inner surface of an upper wall of said disk cassette.

12. The driving apparatus of claim 11 wherein the cassette supporting means comprises a plurality of spring biased members pressing down on the upper wall of the cassette at outer regions thereof.

13. A driving apparatus according to claim 11 wherein said positioning means for positioning the inner surface of the upper wall of the disk cassette comprises an end of a center positioning pin positioned within a central aperture of the central core.

14. The apparatus of claim 13 wherein the center positioning pin has a hemispherical top surface.

15. A flexible magnetic disk cassette system comprising:
a disk cassette formed of a flexible magnetic disk positioned within a cover having upper and lower walls closely spaced to the flexible magnetic disk, said flexible magnetic disk having a central aperture with a corresponding aperture in the lower wall of the disk cassette;
a drive mechanism for receiving the disk cassette thereon and having a pin associated therewith which is positioned through the aperture of the lower wall of the cassette and through the aperture of the magnetic disk; and
an end of the pin abutting against an inner surface of the upper wall of the cassette when the cassette is in position on the driving apparatus so as to insure a given position of the upper wall relative to the lower wall so as to prevent any undesired warping contact of the inner surfaces of the upper and lower walls with the flexible magnetic disk.

16. A system according to claim 14 wherein biasing means are provided so as to press downwardly at outer peripheral edges of the cassette when it is in position on the driving apparatus.

17. The system of claim 16 wherein structural elements are provided in the cassette disk such that when the outer peripheral biasing members are pressing down and the center pin presses up at the inner surface of the upper wall, the upper wall becomes substantially flat and the lower wall becomes substantially flat so as to prevent any warping contact between the upper and lower walls and the flexible magnetic disk.

18. A magnetic disk cassette, comprising:
a flexible magnetic disk;
a cover having upper and lower walls between which the flexible magnetic disk is positioned, said lower wall having a driving hole means therein through which the flexible disk may be driven;
a pan-shaped center-core disk having magnetic material therein and forming a center hollow and outer convex portion at a central portion of the magnetic disk and having in a lower surface of the pan-shaped disk a center aperture means for receiving a center positioning pin and a driving aperture means for receiving a driving pin of said drive device; and
the center aperture means being slightly offset from a center point of the flexible magnetic disk and being designed slightly larger than the center positioning pin such that when the spring biased driving pin engages an edge of the driving aperture means the center positioning pin of the drive device abuts against an edge of the center aperture means and a central axis of the center positioning pin will lie on the center point of the magnetic disk.

19. A magnetic disk cassette, comprising:
a flexible magnetic disk;
a cover having upper and lower walls between which the flexible magnetic disk is positioned, said lower wall having a driving hole means therein through which the flexible disk may be driven;
a pan-shaped center-core disk of magnetic material is positioned centrally on the magnetic disk and has an outer convex portion receivable in and a diameter slightly smaller than said driving hole means in the lower wall and a center hollow having an inner diameter slightly larger than a diameter of a projection from said upper wall receivable with the center hollow.

20. A cassette according to claim 19 wherein the pan-shaped center-core disk constructed of magnetic material is mounted on a central aperture of the flexible magnetic disk.

21. A cassette according to claim 19 wherein the center-core disk has a raised fringe at which it is attached to the flexible magnetic disk.

22. A magnetic disk cassette according to claim 19 wherein the projection at the upper wall is circular and in the form of an annular ring.

23. A magnetic disk cassette, comprising:
a flexible magnetic disk;
a cover having upper and lower walls between which the flexible magnetic disk is positioned, said lower wall having a driving hole means therein through which the flexible disk may be driven; and
a pan-shaped center-core disk having a hollow central portion which receives a projection from said upper wall, said pan-shaped center-core disk being provided at a central portion of the magnetic disk.

24. A cassette according to claim 23 wherein the pan-shaped center-core disk is of a magnetic material, has a raised fringe relative to a lower surface, and the magnetic disk has an aperture within which the pan-shaped center-core disk is positioned therein, and the magnetic disk attaching to the center-core disk at said fringe by adhesive.

* * * * *